Aug. 5, 1941.  A. L. PARKER  2,251,718
COUPLING FOR TUBES
Filed June 3, 1939
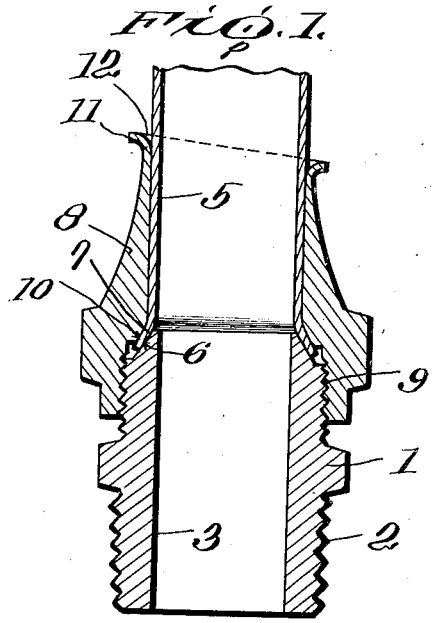
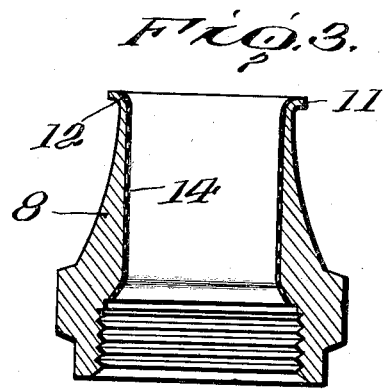
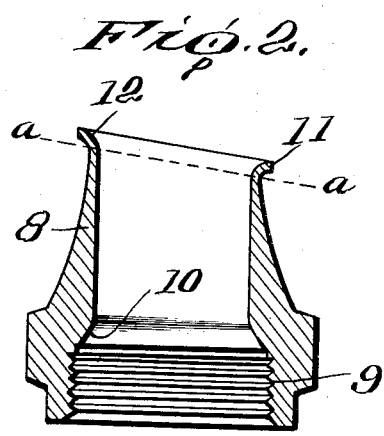
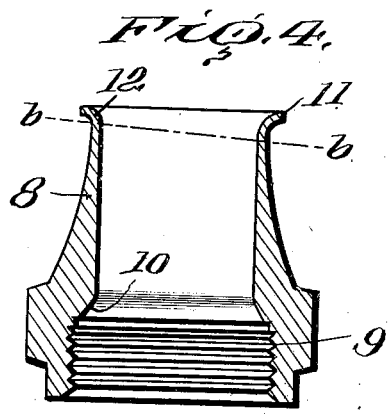
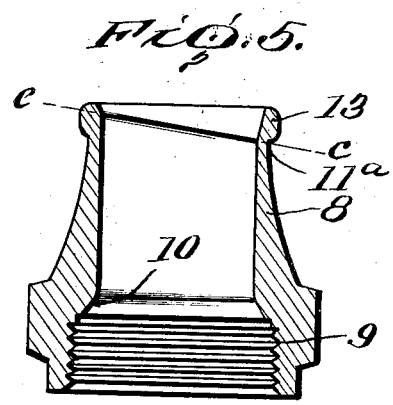
INVENTOR
Arthur L. Parker
By Mason & Porter
ATTORNEYS Patented Aug. 5, 1941

2,251,718

UNITED STATES PATENT OFFICE 2,251,718

COUPLING FOR TUBES

Arthur L. Parker, Cleveland, Ohio

Application June 3, 1939, Serial No. 277,266

1 Claim. (Cl. 285—86)

The invention relates to new and useful improvements in couplings for tubes and more particularly to a coupling which is adapted to clamp the flared end of a tube.

An object of the invention is to provide couplings for tubes of the above character wherein the coupling member receiving the tube and clamping the flared end against the seat is extended along the tube and tapered to a thin edge, and wherein the inner surface of said member throughout the greater portion of its length is of substantially uniform diameter and at the outer end portion is of gradually increasing diameter to the end thereof so as to facilitate the inserting of a tube into said coupling member.

A further object of the invention is to provide a coupling of the above type wherein the line demarking the beginning of the increased diameter of the inner surface is arranged on a bias to the longitudinal axis of the coupling member.

A still further object of the invention is to provide a coupling of the above type wherein the thin edge of the coupling member is curved outwardly at its outer end and terminates in a plane on a bias to the longitudinal axis of the coupling member.

A still further object of the invention is to provide a coupling for tubes wherein the inner surface of the coupling member which extends along the tube and clamps the tapered end against a seat is provided with a coating of lubricant, which coating has been burnished so as to cause the same to adhere to the metal and provide a hard smooth surface for the same.

These and other objects will in part be obvious and will in part be hereinafter more fully disclosed.

In the drawing—

Figure 1 is a longitudinal sectional view through coupling members embodying the improvements, which coupling members have been applied to a tube for clamping the same to one of the coupling members;

Fig. 2 is an enlarged view of the preferred form of coupling member which is to be applied to the tube and utilized for clamping the flared end thereof against the seat on the other coupling member;

Fig. 3 is a view similar to Fig. 2, and showing a modified form of construction at the outer end of the coupling member;

Fig. 4 is a view similar to Fig. 2, but showing a still further modified form of construction at the outer end of the coupling member, and Fig. 5 is a view similar to Fig. 2, and showing a still further modified form of construction at the outer end of the coupling member.

The invention as illustrated is embodied in a coupling for tubes which includes a male coupling member 1 having a threaded portion 2 whereby said member may be secured to any desired part. Said coupling member 1 has a bore 3 therethrough which is of substantially the same diameter as the tube 5 which is to be clamped to the coupling member. The coupling member 1 is also provided with a tapered seat 6. The tube 5 has the end thereof flared as indicated at 7. This flared end is so shaped as to engage the seat 6 on the coupling member 1.

The flared end of the tube is clamped against the seat 6 by the coupling member 8. The two coupling members have a threaded connection 9. The coupling member 8 is provided with a clamping face 10 which conforms to the angle of the outer face of the flared end of the tube. This coupling member 8 extends along the tube and is tapered to a comparatively thin edge portion 11. The thin edge portion 11 is rolled outwardly as indicated at 12. The bore through the coupling member 8 from the clamping face 10 to a line a—a near the outer end of the coupling member is of substantially uniform diameter, and from the line a—a the diameter increases to the outer edge of the coupling member. When the coupling member is extended and tapered to a thin edge, without this increasing of the diameter at the entrance end, the edge is easily bent or nicked inwardly, so that it is likely to prevent the entrance of the tube into the coupling member, which results in the scrapping of the fittings which become nicked or slightly crushed at this edge, or making it necessary to use a reamer to true up the bore. When, however, the coupling member is curved upwardly or tapered outwardly so as to provide a flared entrance, the tube can readily be inserted in the coupling member without any nicking or crushing of the thin edge thereof.

As shown in Figures 1 and 2, the outer edge of the coupling member 8 terminates so as to lie in a plane which is on a bias to the longitudinal axis of the coupling member, and the edge portion is rolled out in order to provide a flared entrance for inserting the tube in the coupling member. When the line of contact at the outer end of the coupling member 8 lies in a plane on the bias, any work-hardening of the tube due to vibration strain will be along this line. It is well known that when such a work-hardening line is in a plane on the bias to the axis of the tube, the tube is much less likely to fracture than when the work-hardening line lies in a perfect circle with the plane cutting the axis of the tube at right angles.

In Figure 3 of the drawing, the outer end of the coupling member 8 is thinned as indicated at 11 and terminates in a plane at right angles to the longitudinal axis of the coupling. The outer edge portion of this coupling member is curved outwardly as indicated at 12. This greatly facilitates the insertion of the tube in the coupling member. This surface is curved about the center lying outside of the coupling, and therefore, the surface gradually merges from a surface which is parallel with the axis of the coupling to a surface which is at right angles thereto. This gradual curving of the outer end of the coupling member so distributes the wear on the tube as to reduce to a minimum the work-hardening of the tube under the strains of vibration.

As shown in Figure 4, the coupling member 8 is shaped so as to provide a thinned edge 11 at its outer end and the outer end portion of the coupling member is irregularly flared or curved so that the line where the inner surface of the coupling begins to curve outwardly lies in the plane b—b (Fig. 4) which is on a bias to the longitudinal axis of the coupling member. Here again, the work-hardening line on the tube incident to vibrations thereof is on a line lying in a plane at a bias to the longitudinal axis of the tube, and this together with the curving of the surface reduces the wear on the tube and distributes the same so that there is even less likelihood of the tube fracturing under vibrating strain.

As shown in Figure 5, the coupling member 8 is thinned as indicated at 11a, and the thinned edge is beaded as indicated at 13. The coupling member is of substantially uniform diameter from the seat 9 to the line c—c. This line c—c lies in a plane which is on a bias to the longitudinal axis of the coupling member. The surface of the coupling from the line c—c to the outer end thereof gradually increases in diameter. This produces, in effect, a flared end on the coupling member which greatly facilitates the entrance of the tube into the coupling member. The change from a uniform diameter to the tapering diameter being on a line lying in a plane on the bias to the longitudinal axis of the coupling, will so position any work-hardening of the tube under vibration thereof as to reduce the liability of fracturing the tube.

From the above it will be apparent that a very efficient coupling has been provided for clamping the flared end of a metal tube. When the sleeve coupling member which surrounds the tube is provided with an internal bore conforming closely to the outer diameter of the tube as shown in the drawing, and is extended some distance out from the clamped flared end of the tube it will receive and dampen vibrations imparted to the tube. This is aided by gradually decreasing the outer diameter of the clamping sleeve toward the outer end thereof so that said sleeve terminates in a relatively thin edge. When so constructed the rigidity of the sleeve gradually diminishes from the clamping portion toward the outer end of the sleeve. When vibrations are imparted to the tube it will contact with the thin end of the coupling and the latter will flex slightly under impulses of vibration. This yielding contact initiates the dampening of the vibrations in the tube but does not stop them abruptly. As the coupling member gradually thickens toward the seat after the flared end of the tube is clamped, the rigidity of the coupling increases and the tube vibrations are, therefore, gradually eliminated.

When a fitting of the design described is assembled with the tube there is a considerable amount of friction generated between the nut or coupling member and the tube. The greatest amount of friction is concentrated on the seat 9 where the coupling member 8 where it contacts with the flared end of the tube, but there is also a certain amount of friction present along the bore or inner surface of the coupling member 8. This is due to the fact that although the coupling member is bored to a diameter slightly larger than the outside diameter of the tube, the tube is not always in perfect alinement with the fitting when it is installed. The results of this friction between the nut or coupling member 8 and the tube is a binding of the parts when assembled; also a tendency of the tube to turn with the nut and thus complicate and impede installation, and sometimes the parts will actually seize. This is particularly true when the parts are made of aluminum alloy. When the coupling is assembled and disassembled a number of times, the friction between the coupling member 8 and the flared end of the tube often wears away and thins the flared end to an objectionable extent.

To reduce the friction between the coupling member 8 and the tube and thereby avoid the detrimental results noted above, the inside surface of the coupling is coated with a suitable lubricant, which coating is subjected to a burnishing operation. The burnished coating of lubricant is illustrated at 14 on the coupling member shown in Figure 3. It is understood that this coating of lubricant may be applied to any of the forms with equal advantage. Any common lubricant may be used such as waxes, stearates, etc., but it is preferred to use the coating material described in the Parker Patent No. 2,102,214, granted December 14, 1937. The burnishing of the lubricant packs it solidly but in adhering contact with the metal and provides a hard smooth surface that will retain excellent lubricating qualities for a long period of time and under repeated assembly and disassembly of the fitting. Burnishing of the lubricant also renders it less likely to be washed out when contacted by gasoline or other liquids by which it is ordinarily disintegrated.

It is obvious that various changes in the details of construction and the design of the coupling members may be made without departing from the spirit of the invention as set forth in the appended claim.

Having thus described the invention, what I claim as new and desire to secure by Letters Patent, is:

A coupling for metal tubes having the ends thereof flared comprising coupling members having threaded engagement with each other, one of said coupling members having a tapered seat associated therewith adapted to engage the inner face of the flared end of the tube, the other coupling member having a tapered clamping portion adapted to engage the outer face of the flared end of the tube, the inner surface of said last-named coupling from the tapered clamping portion to a line adjacent the outer end thereof being of uniform diameter and adapted to conform closely to the diameter of the tube, said last-named coupling having a relatively thick wall in the region of the clamping surface thereon, said wall gradually decreasing in diameter and terminating at the outer end in a relatively thin edge, thus providing a gradually diminishing rigidity toward the end of said coupling member, the extreme outer portion of said last-named coupling member being gradually curved outwardly on its inner surface to strengthen said edge and to facilitate the entrance of a tube into said coupling member.

ARTHUR L. PARKER.